United States Patent
Takai

(10) Patent No.: US 7,483,073 B2
(45) Date of Patent: *Jan. 27, 2009

(54) IMAGE SENSING APPARATUS CLEANING OPERATION AND CONTROL METHOD OF SAID CLEANING OPERATION

(75) Inventor: Junji Takai, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/031,215

(22) Filed: Feb. 14, 2008

(65) Prior Publication Data

US 2008/0138058 A1    Jun. 12, 2008

Related U.S. Application Data

(63) Continuation of application No. 10/786,897, filed on Feb. 24, 2004, now Pat. No. 7,355,649.

(30) Foreign Application Priority Data

Feb. 26, 2003    (JP) .............................. 2003-049974

(51) Int. Cl.
    *H04N 5/225*    (2006.01)
(52) U.S. Cl. ............. 348/372; 348/333.13; 348/207.99; 348/335
(58) Field of Classification Search ............ 348/333.13, 348/208.15, 208.16, 372, 208.12, 246, 374, 348/335, 208.1

See application file for complete search history.

(56) References Cited

U.S. PATENT DOCUMENTS

| | | | |
|---|---|---|---|
| 4,716,433 A | 12/1987 | Alyfuku | |
| 4,992,821 A | 2/1991 | Kiuchi et al. | |
| 5,196,880 A | 3/1993 | Ishibashi et al. | |
| 5,302,991 A | 4/1994 | Nakayama | |
| 5,527,630 A | 6/1996 | Nagata et al. | |
| 5,721,987 A | 2/1998 | Ozawa | |
| 5,757,428 A | 5/1998 | Takei | |
| 5,799,217 A | 8/1998 | Saegusa et al. | |
| 5,986,706 A | 11/1999 | Hirasawa | |
| 6,023,539 A | 2/2000 | Ohnami et al. | |
| 6,031,999 A | 2/2000 | Ogawa | |
| 6,304,291 B1 | 10/2001 | Silverbrook | |
| 6,674,965 B2 | 1/2004 | Takahashi | |
| 6,710,809 B1 | 3/2004 | Niikawa | |
| 6,735,455 B2 | 5/2004 | Naito et al. | |

(Continued)

*Primary Examiner*—David L Ometz
*Assistant Examiner*—Usman Khan
(74) *Attorney, Agent, or Firm*—Morgan & Finnegan, LLP

(57) ABSTRACT

Image sensing apparatus having an image sensing element for sensing an object of shooting is provided. According to one aspect of the invention, when a cleaning mode is designated and executed to remove a foreign substance in the neighborhood of and on the image sensing element, the remaining amount of a battery which supplies electric power to the image sensing apparatus is detected by a voltage detector. If the remaining amount of the battery declines to a first predetermined value or less, a warning is issued by a lamp or a sound production unit. Moreover, if the remaining amount of the battery is the first predetermined value or less, a shift to the cleaning mode is prohibited. Furthermore, if the remaining amount of the battery declines to a second predetermined value or less, which is a lower value than the first predetermined value, mirror-down processing is performed so that cleaning operation cannot be executed.

4 Claims, 5 Drawing Sheets

U.S. PATENT DOCUMENTS

| | | |
|---|---|---|
| 6,771,896 B2 | 8/2004 | Tamura et al. |
| 6,833,866 B1 | 12/2004 | Suzuki |
| 6,922,211 B2 | 7/2005 | Sturiale |
| 2001/0005686 A1* | 6/2001 | Naito et al. .................. 455/574 |
| 2002/0118968 A1* | 8/2002 | Takahashi ................... 396/277 |

* cited by examiner

IMAGE SENSING APPARATUS CLEANING OPERATION AND CONTROL METHOD OF SAID CLEANING OPERATION

This application is a continuation of prior application Ser. No. 10/786,897, filed Feb. 24, 2004, now U.S. Pat. No. 7,355,649, to which priority under 35 U.S.C. §120 is claimed. This application claims a benefit of priority based on Japanese Patent Application No. 2003-049974, filed on Feb. 26, 2003, which is hereby incorporated by reference herein in its entirety as if fully set forth herein.

FIELD OF THE INVENTION

The present invention relates to an image sensing apparatus of optical equipment, e.g., a camera, and a control method thereof.

BACKGROUND OF THE INVENTION

Recently a large number of digital cameras, which store images sensed by an image sensing element such as a CCD in a storage medium such as a memory card, are available on the market. A digital camera of this type, which does not require a film, stores an image signal sensed by the image sensing element in an external storage device, e.g., a CF card, hard disk and so on. Since such external storage device allows rewriting and erasing a number of times unlike films, expenses for the consumables can be kept low, which is very convenient.

Most of these digital cameras include an LCD monitor capable of displaying an image and a large-capacity memory such as a memory card. With the use of such digital cameras, not only films which have conventionally been used as consumables become unnecessary, but also outcomes of a photographed image can instantly be confirmed on the LCD monitor. Therefore, image data thought to be unnecessary by an operator can be erased in an instant, and an image can be photographed again if it is necessary. Digital cameras have enabled editing of an image stored in the memory at the scene of photographing, thus dramatically increasing the efficiency of photographing compared to silver chloride photographs.

On the contrary, conventional digital cameras have a problem. If a foreign substance, e.g., dust, which is unrelated to an object of shooting exists in the neighborhood of the image forming surface of the image sensing element such as a CCD (e.g., on the cover glass of a CCD), the image of the foreign substance is also photographed. A conventional silver chloride film also has the same problem of picking up an image of foreign substance if dust or the like exists on the film. However, in the case of a film, since film is moved every time one frame of photograph is taken, it is extremely rare to pick up the same dust on all frames.

However, in the case of the digital camera which senses an image with the image sensing element, since there is no mechanical movement after an image is photographed, once a foreign substance such as dust attaches to the image sensing element, there is a possibility that the dust is photographed on all frames after then. For this reason, an operator must always be careful about dust attachment to the image sensing element (CCD), and expends enormous effort in examining for the dust and cleaning. Particularly since the image sensing element (CCD) is arranged in the inner portion of the camera, examining for foreign substances is not easy.

In a digital camera of single lens reflex type, dust invasion easily takes place due to attachment and removal of the lens. Furthermore, in many cases of digital cameras of single lens reflex type, a focal plane shutter is arranged immediately before the image sensing element. Therefore, a mechanical operation of the shutter easily allows dust attachment to the image sensing element. Accordingly, it has been a great problem for a digital camera to identify and clean the dust attached to the image sensing element.

In view of this, digital cameras available on the market have begun to comprise a function (dusting mode) for identifying dust on the image sensing element using an LCD monitor, a function (cleaning mode) for removing foreign substances on the image sensing element by making the camera into a bulb state, and so on. Using the dusting mode of such digital camera enables easy identification of foreign substance attachment, e.g., dust, through an LCD monitor, or using the cleaning mode enables cleaning of the CCD cover glass surface from the lens mounting side.

However, the above-described conventional example has following problems.

During the cleaning mode operation, if the battery (portable electric power source) voltage declines to a level that cannot hold the rear curtain magnet of the shutter, the rear curtain of the shutter travels. More specifically, if the battery voltage declines causing the shutter rear curtain to travel while an operator removes dust or stain on the CCD surface from the lens mounting side using a cleaning tool such as a blower, the shutter is damaged and thereafter image sensing may become impossible. Since shutter repairing requires a high cost, damaging a sector is a great loss for a user.

SUMMARY OF THE INVENTION

The present invention has been proposed in view of the above-described conventional art, and has as its feature to provide a technique that prevents a shutter curtain from being damaged due to declined electric power supply during a cleaning operation of a cleaning mode.

A feature of the present invention is to provide an image sensing apparatus and a control method thereof that can prevent troubles caused by traveling of a shutter curtain due to declined electric power supply during a cleaning operation.

According to the present invention, there is provided to an image sensing apparatus for capturing an image of object by an image sensing element, comprises power supply unit configured to supply electric power to the image sensing apparatus; detection unit configured to detect electric power supplied from the power supply unit; designation unit for designating a shift to a cleaning mode to remove a foreign substance in a neighborhood of and on a photoreceptive surface of the image sensing element; and warning issuance unit configured to issue a warning in a case where the electric power detected by the detection unit declines to a first predetermined value or less during execution of the cleaning mode designated by the designation unit.

According to the present invention, there is provided to a control method of a single lens reflex image sensing apparatus for capturing an object by an image sensing element, comprises a detection step of detecting electric power supplied to the image sensing apparatus; a designation step of designating a shift to a cleaning mode to remove a foreign substance in a neighborhood of and on a photoreceptive surface of the image sensing element; a cleaning mode setting step of setting the cleaning mode by moving up a mirror for the single lens reflex and making a shutter front curtain to travel; and a warning issuance step of issuing a warning in a case where the electric power detected in the detection step declines to a first predetermined value or less in a state where the cleaning mode is set in the cleaning mode setting step in accordance with designation in the designation step.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
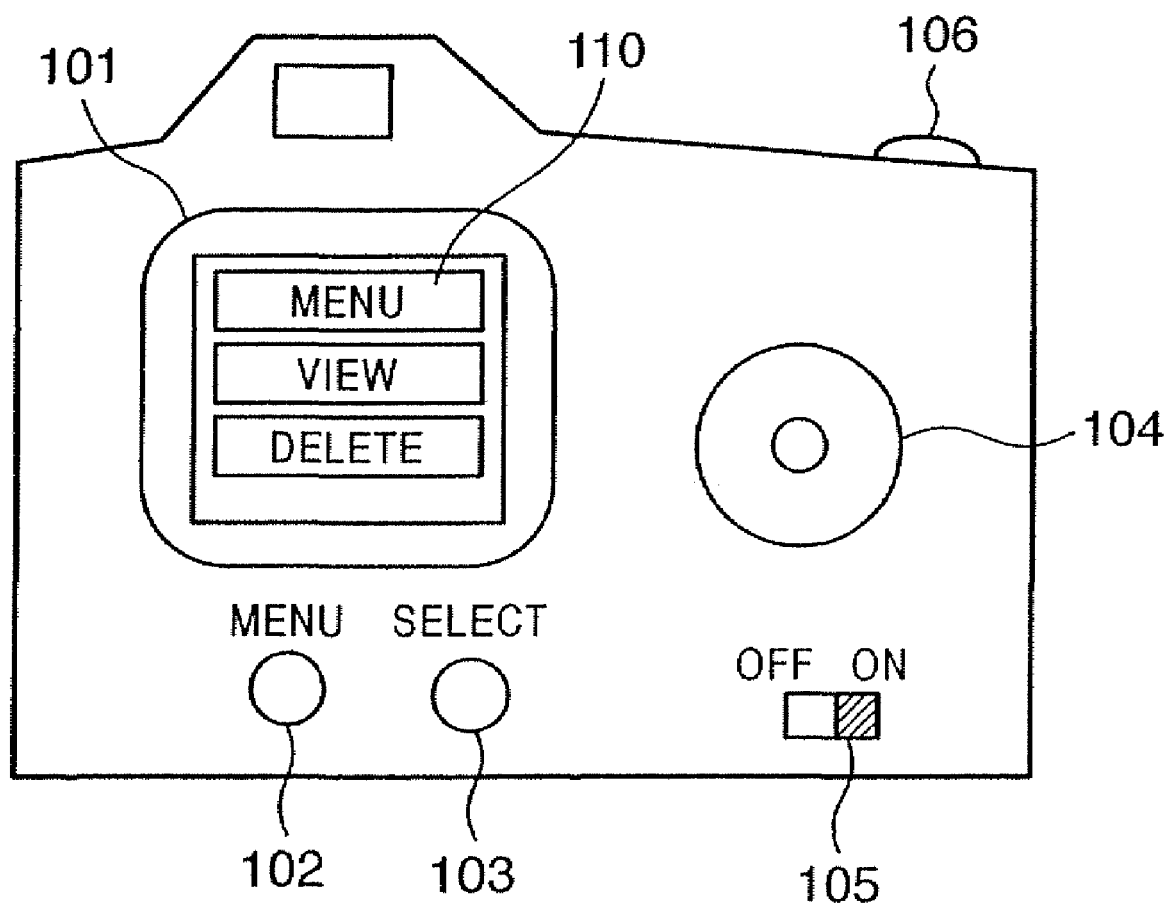
FIG. 1 depicts a back view of a single lens reflex digital camera according to an embodiment of the present invention.

FIG. 1 depicts a back view of a digital camera according to the embodiment of the present invention. The digital camera comprises the dusting mode and cleaning mode.

Referring to FIG. 1, numeral 101 denotes an LCD monitor which is used for displaying an image to be sensed or already sensed and stored in a memory or displaying a menu screen. Numeral 102 denotes a menu button (MENU) which causes displaying of menu items upon depression of the button. Numeral 103 denotes a select button which designates execution of a mode selected at the time of button depression. Numeral 104 denotes an electronic dial which is used for switching an image sensing mode, an image displaying mode of a photographed image, and so forth. By rotating the electronic dial 104, a cursor moves (not shown) on the menu displayed on the LCD monitor 101, allowing a user to select a desired menu item. Numeral 105 denotes a power switch for starting up the camera. By turning on (ON) the switch, the camera turns to an operative state, and by turning off (OFF) the switch, the camera turns to an inoperative state. The switch 105 is also used for designating termination of a cleaning operation, which will be described later. Numeral 106 denotes a shutter for image sensing.

To display an image on the LCD monitor 101 or to select camera initial setting, an image sensing mode and the like, the menu button 102 is depressed and the electronic dial 104 is rotated to position the cursor to a desired mode. When a desired mode is selected by the cursor, the select button 103 is depressed to complete the mode selection.

To select the aforementioned dusting mode and cleaning mode, the electronic dial 104 shown in FIG. 1 is rotated to position the cursor (not shown) to the MENU 110, and the select button 103 is depressed to select the menu screen. By this operation, the LCD monitor 101 is switched to a screen shown in FIG. 2.

Figure 2:
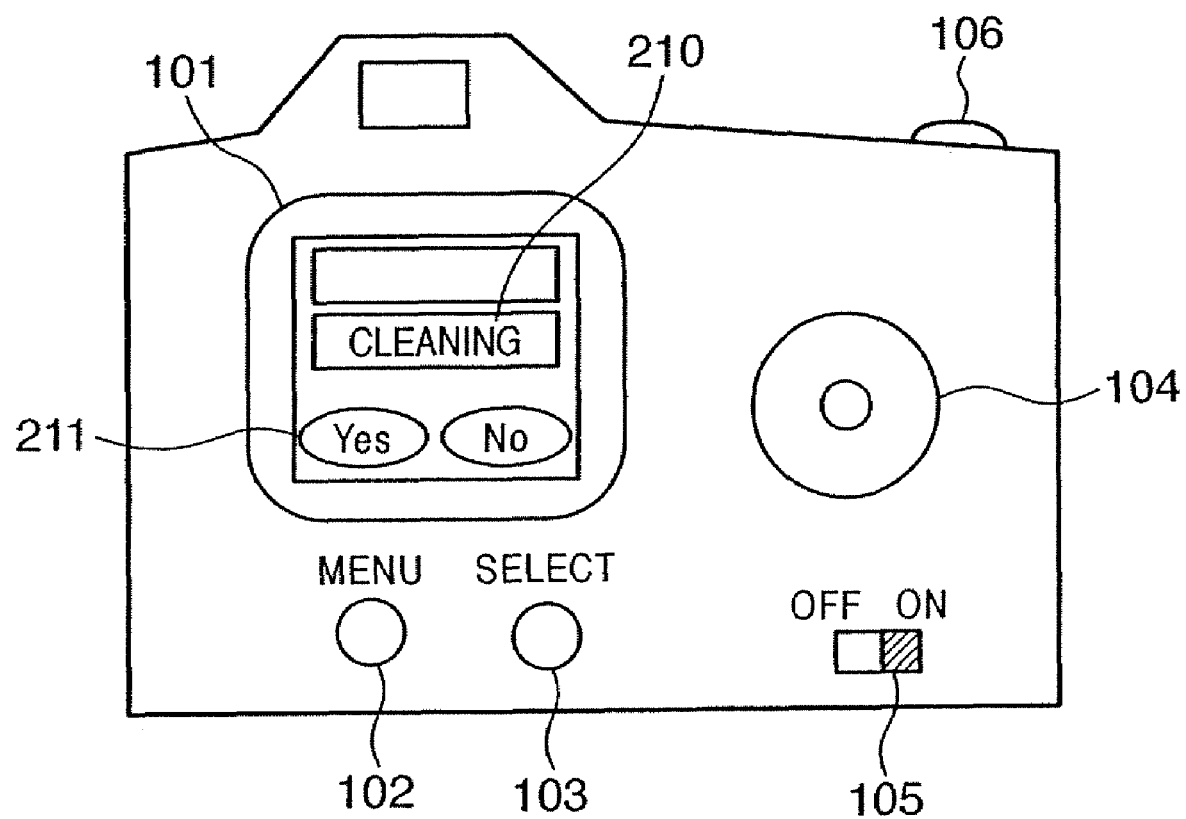
FIG. 2 depicts a back view of the single lens reflex digital camera at the time of cleaning mode selection according to the embodiment of the present invention.

FIG. 2 shows a state where the menu screen is displayed. Note, although FIG. 2 only shows the "cleaning" 210 as the menu item since it is related to this embodiment, other menu items are also shown as a matter of course.

Referring to FIG. 2, the electronic dial 104 is rotated to move the cursor to the "cleaning" 210, and the select button 103 is depressed to select the cleaning mode. Upon confirmation of whether or not to shift the camera to the cleaning mode, the electronic dial 104 is rotated to move the cursor to "Yes" 211, and the select button 103 is depressed to confirm to shift to the cleaning mode. Then, the shutter 106 is depressed to start the cleaning operation.

Figure 3:
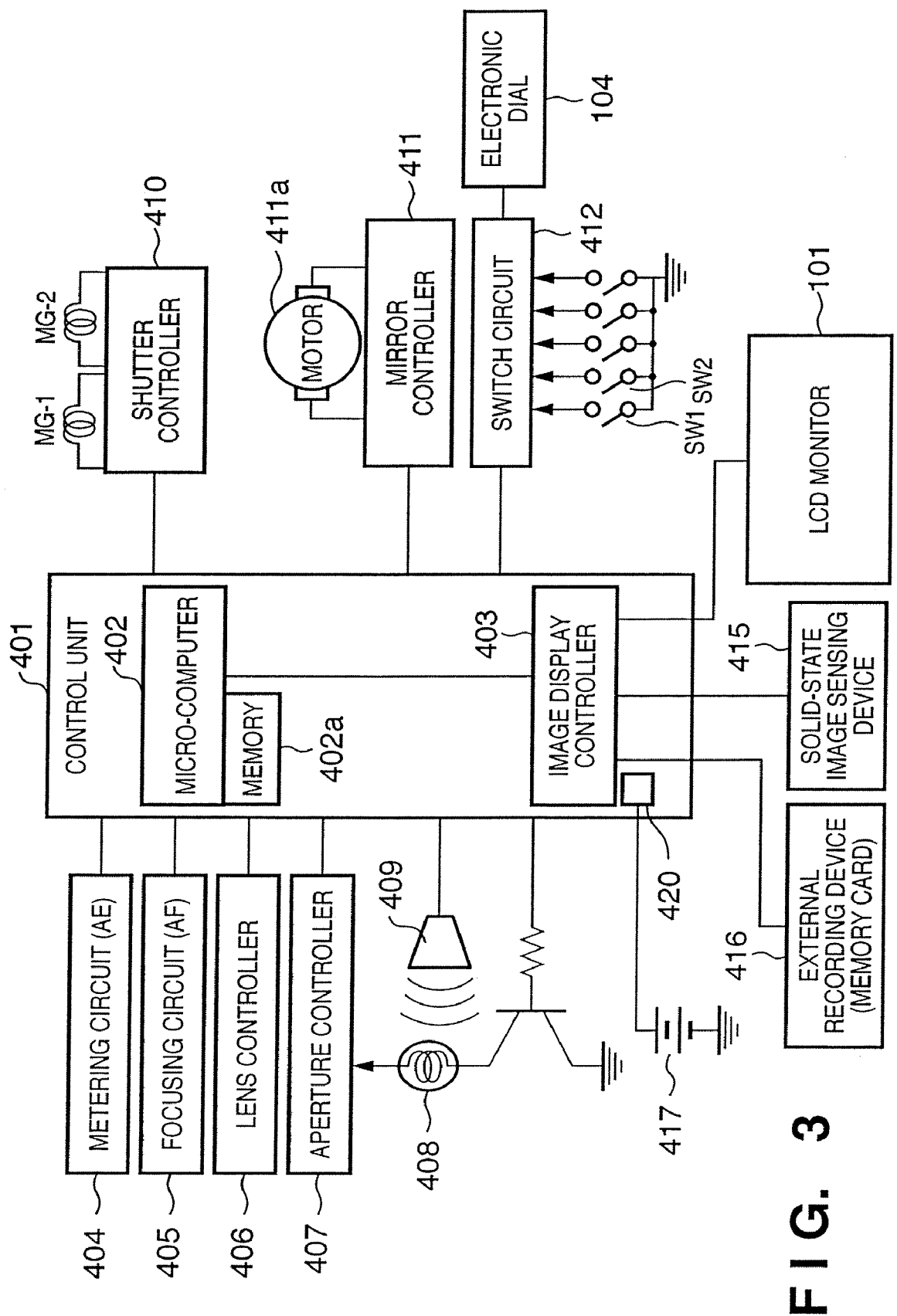
FIG. 3 is a block diagram showing a construction of the single lens reflex digital camera according to the embodiment of the present invention.

FIG. 3 is a block diagram showing a construction of the single lens reflex digital camera according to this embodiment. The components common to the above-described drawings are referred to by the same reference numerals.

Numeral 401 denotes a control unit for controlling the operation of the entire camera. The control unit 401 comprises a micro-computer (CPU) 402, a memory 402a storing a control program of the CPU 402, an image display controller 403 which processes image signals outputted from a solid-state image sensing device 415 and displays an image on the LCD monitor 101, and a voltage detector 420 which detects a voltage outputted from a battery 417. Image data processed by the control unit 401 is, for instance, JPEG-coded, and stored in an external recording device 416, e.g., a Compact Flash (CF) card. The solid-state image sensing device 415 corresponds to an image sensing element (CCD) which senses an object of shooting.

Numeral 404 denotes a metering circuit which measures luminance of an object of shooting. Numeral 405 denotes a focusing circuit which detects a defocus amount of an object of shooting for automatic focusing (AF). Numeral 406 denotes a lens controller which drives the lens for focusing based on a calculation result of the focusing circuit 405 in AF operation. Numeral 407 denotes an aperture controller which drives aperture blades.

Numeral 408 denotes a lamp (or an LED) which is light emission means serving as a part of power-source-warning indicator means. Numeral 409 denotes a sounding unit which is sound production means such as a buzzer, serving as a part of the power-source-warning indicator means.

Numeral 411 denotes a mirror controller which moves up/down the mirror. Mirror movement is controlled by driving a motor 411a or applying the brake. Numeral 410 denotes a shutter controller which controls traveling of the shutter front curtain and rear curtain (not shown). Cutting off electric power supply to the magnet MG-1 enables traveling of the front curtain. Cutting off power supply to the magnet MG-2 enables traveling of the rear curtain. When electric power supply to the magnets MG-1 and MG-2 is resumed, the front and rear curtains return to the original positions.

Numeral 412 denotes a switch circuit which detects an operation of the above-described menu button 102, select button 103, electronic dial 104, shutter 106 and other switches (not shown), generates corresponding signals and outputs the signal to the control unit 401. SW1 is activated when the shutter 106 is depressed half way down. Upon activation of SW1, the control unit 401 performs automatic focusing (AF) using the focusing circuit 405 and metering circuit 404, and measures luminance of an object of shooting. SW2 is activated when the shutter 106 is depressed all the way down. By this, the digital camera according to this embodiment starts an image sensing operation. When the cleaning mode is set, a cleaning operation is started. Numeral 417 denotes power supply means, i.e., a battery (portable battery).

Figure 4:
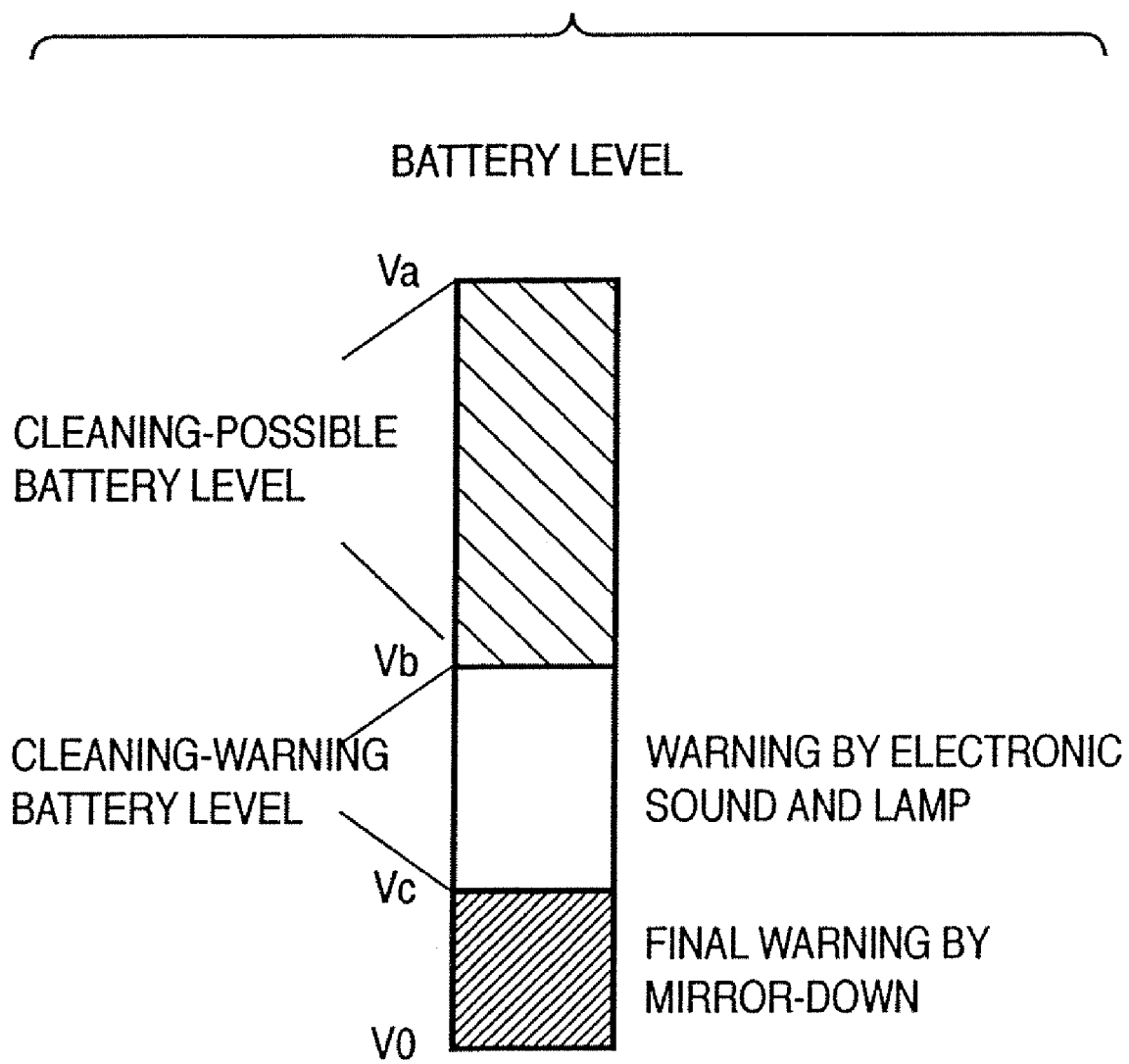
FIG. 4 depicts an explanatory view of a method of processing performed in correspondence with a battery voltage of the digital camera according to the embodiment.

FIG. 4 depicts an explanatory view showing a relation between the control and an output voltage of the battery 417.

An output voltage of the battery 417 is represented by the minimum voltage V0 to maximum voltage Va. It is defined that the cleaning operation is executed only when the voltage is Vb or more. When the voltage is Vb or less and is Vc or more, a warning is issued by the lamp 408 and/or sounding unit 409 to notify that the cleaning operation cannot be executed. In this case, the cleaning operation cannot be started. When the voltage is Vc or less, a final warning is issued by mirror-down operation. With the voltage in this range (V0 to Vc), the camera is not operative.

Next, an operation of the digital camera according to this embodiment is described with reference to the flowchart in FIG. 5. Note that since the operation of the metering circuit 404, focusing circuit 405, lens controller 406 and aperture controller 407 is not directly related to the claimed invention, descriptions of the operation are omitted.

Figure 5:
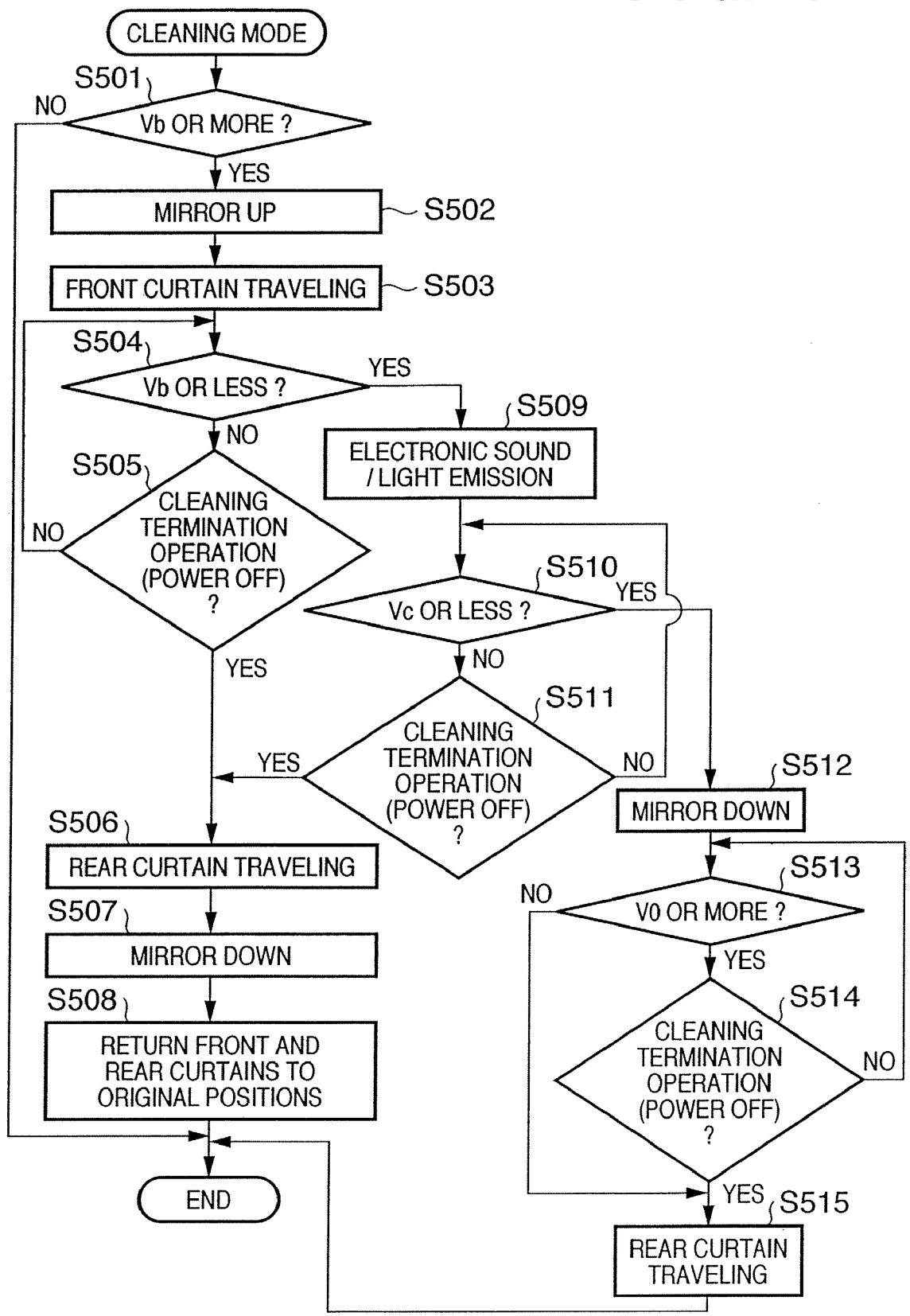
FIG. 5 is a flowchart describing a cleaning procedure in the single lens reflex digital camera according to the embodiment of the present invention.

FIG. 5 is a flowchart describing a procedure in the cleaning mode of the digital camera according to this embodiment. A program which executes this procedure is stored in the memory 402*a*, and the program is executed under the control of the CPU 402. As mentioned above with reference to FIG. 2, this procedure starts when the cleaning 210 is selected by the electronic dial 104, the select button 103 is depressed, then "Yes" 211 is designated, and the shutter 106 is depressed.

In step S501, an output voltage of the external power source (portable battery) 417 is detected by the voltage detector 420 and it is determined whether or not the detected voltage is Vb or more as shown in FIG. 4. If the voltage is not Vb or more, the control ends since cleaning operation cannot be started.

In step S501, if the output voltage of the battery 417 is Vb or more, the control proceeds to step S502 where mirror-up processing is performed. In the mirror-up processing, the motor 411*a* of the mirror controller 411 is driven to lift up the mirror, and driving of the motor 411*a* is stopped when the mirror is lifted all the way up. Next in step S503, electric power supply to the magnet MG-1 is cut off by the shutter controller 410. By this, the front curtain begins traveling. When the front curtain travels, the camera turns to a bulb state, allowing a user to remove the lens and start the cleaning operation.

During the cleaning operation, electric power is supplied to the magnet MG-2 for holding the shutter rear curtain so that the shutter rear curtain does not travel. Therefore, during the cleaning operation, a constant current is supplied from the battery 417, and electric power of the battery 417 is consumed. For this reason, even during the cleaning operation, the voltage detector 420 keeps detecting the output voltage of the battery 417 in step S504 to monitor whether the output voltage declines to Vb or less. If the voltage does not decline to Vb or less, the control proceeds to step S505 to determine whether or not the switch 105 is turned off to designate termination of the cleaning operation. When the switch 105 is turned off, the control proceeds to step S506. Electric power supply to the magnet MG-2 is cut off by the shutter controller 410 and traveling of the rear curtain begins. When traveling of the rear curtain is completed, the control proceeds to step S507 where mirror-down processing is performed. In the mirror-down processing, the motor 411*a* is driven by the mirror controller 411 to move down the mirror, and driving of the motor 411*a* is stopped when the mirror is moved all the way down. Next in step S508, the shutter controller 410 is controlled to supply electric power to the magnets MG-1 and MG-2, thereby returning the front curtain and rear curtain to the original positions. Then, the cleaning procedure ends.

Meanwhile, in step S504, if the output voltage of the battery declines to Vb or less, the control proceeds to step S509. A warning is outputted by the lamp 408 and/or sounding unit 409 such as a buzzer to notify that the output voltage of the battery 417 has declined. In step S510, it is further determined whether or not the output voltage of the battery 417 has declined to Vc or less based on the detection output of the voltage detector 420. If it is not Vc or less, the control proceeds to step S511 where it is determined whether or not cleaning termination has been designated by the switch 105. When termination is designated in step S511, the control proceeds to aforementioned step S506 where rear curtain traveling is performed, and proceeds to step S507. If termination is not designated in step S511, the control returns to step S510 to repeat the above-described procedure.

In step S510, if the output voltage of the battery 417 declines to Vc or less, the control proceeds to step S512 where the motor 411*a* of the mirror controller 411 is driven to move down the mirror. When the mirror is moved all the way down, driving of the motor 411*a* is stopped to end mirror-down operation. By this procedure, the cleaning operation performed by the user is forcefully terminated. In step S513, the output voltage of the battery 417 is checked based on the detection output of the voltage detector 420. If the output voltage is V0 (voltage 0) or more, the control proceeds to step S514 to determine whether or not the switch 105 is turned off to designate termination of the cleaning. If termination of the cleaning operation is designated in step S514, the control proceeds to step S515. Electric power supply to the magnet MG-2 is cut off by the shutter controller 410 to start rear curtain traveling, thereafter electric power is supplied to the magnets MG-1 and MG-2 to return the front curtain and rear curtain to the original positions, and the control ends. If termination is not designated in step S514, the control returns to step S513. If the output voltage of the battery 417 is not V0 or more in step S513, the control proceeds to step S515 where electric power supply to the magnet MG-2 is cut off by the shutter controller 410 to start rear curtain traveling, and the control ends.

As described above, according to the digital camera proposed by the present embodiment, it is possible to issue a warning when a power source (battery) voltage declines below a predetermined value in the cleaning mode. By virtue of this feature, a user can terminate the cleaning operation, making it possible to prevent the rear curtain of the shutter from being damaged that is caused by traveling of the rear curtain during a cleaning operation.

Furthermore, when the power (battery) voltage declines to a level that cannot continue the cleaning operation, the cleaning mode is forcefully terminated to prevent the rear curtain of the shutter from traveling despite user's intention and damaging the shutter curtain.

Note although the above-described embodiment determines the remaining electric power amount of battery by whether or not the output voltage of the battery 417 is a predetermined value, the present invention is not limited to this method. For instance, a load current supplied by the battery 417 may be checked, and the remaining electric power amount of the battery may be determined based on the load current value. Alternatively, an amount of electric power supplied by the battery 417 may be obtained, and based on whether or not the amount of electric power supply is larger than a predetermined value, the above-described control may be executed.

OTHER EMBODIMENT

As mentioned above, the object of the present invention is also achieved by providing a system or apparatus with a storage medium that stores program codes for software realizing the above-described embodiment, reading the program codes stored in the storage medium by a computer (CPU or MPU) of the system or apparatus, and executing the program. In this case, the program codes read from the storage medium realize the functions according to the embodiment, and the storage medium storing the program codes constitutes the invention. The storage medium, such as a floppy (registered trademark) disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or the entire processes in accordance with designations of the program codes and realizes functions of the above embodiment.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or the entire processes in accordance with designations of the program codes and realizes functions of the above embodiment.

As has been set forth above, according to the present embodiment, when the output voltage of a power source declines during a cleaning operation, various warnings such as sounding an alarm, lighting up an light emission lamp, moving down the mirror and so forth are given. Accordingly, it is possible to prevent the rear curtain of the shutter from traveling during a cleaning operation and damaging the shutter curtain.

The present invention is not limited to the above embodiment and various changes and modifications can be made within the spirit and scope of the present invention. Therefore, to apprise the public of the scope of the present invention, the following claims are made.

What is claimed is:

1. A single lens reflex image sensing apparatus for capturing an image of object by an image sensing element, comprising:
   a battery for supplying electric power to the single lens reflex image sensing apparatus;
   an operation unit configured to designate a cleaning mode for removing a foreign substance in a neighborhood of or on a photoreceptive surface of the image sensing element;
   a voltage detector configured to detect an output voltage of said battery;
   a mirror controller configured to move up and down a mirror;
   a cleaning operation allowing unit configured to cause said mirror controller to move up the mirror to allow a cleaning operation, in a case where said operation unit designates the cleaning mode and the output voltage detected by said voltage detector is a predetermined value or more; and
   a termination unit configured to cause said mirror controller to move down the mirror in order to forcefully terminate the cleaning operation, in a case where the output voltage detected by said voltage detector declines to the predetermined value or less in the cleaning mode.

2. A single lens reflex image sensing apparatus according to claim 1, wherein said termination unit causes said mirror controller to move down the mirror and then travels a curtain of a shutter to close the shutter.

3. A control method of a single lens reflex image sensing apparatus for capturing an image of object by an image sensing element, comprising the steps:
   designating a cleaning mode for removing a foreign substance in a neighborhood of or on a photoreceptive surface of the image sensing element;
   detecting an output voltage of a battery for supplying electric power to the single lens reflex image sensing apparatus;
   moving up a mirror to allow a cleaning operation in the cleaning mode for removing the foreign substance, in a case where the cleaning mode is designated in said designating step and the output voltage detected in said detecting step is a predetermined value or more; and
   moving down the mirror in order to forcefully terminate the cleaning operation, in a case where the output voltage detected in said detecting step declines to the predetermined value or less in the cleaning mode.

4. A method according to claim 3, further comprising a step of traveling a curtain of a shutter to close the shutter after said moving down step of the mirror.

* * * * *